US011955802B2

(12) United States Patent
Zhang et al.

(10) Patent No.: US 11,955,802 B2
(45) Date of Patent: Apr. 9, 2024

(54) POWER SUPPLY DEVICE AND CONTROL METHOD

(71) Applicant: HUAWEI TECHNOLOGIES CO., LTD., Guangdong (CN)

(72) Inventors: Xueji Zhang, Shenzhen (CN); Liqun Xiong, Shenzhen (CN); Jinli Feng, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 198 days.

(21) Appl. No.: 17/587,649

(22) Filed: Jan. 28, 2022

(65) Prior Publication Data

US 2022/0158458 A1 May 19, 2022

Related U.S. Application Data

(63) Continuation of application No. PCT/CN2020/089209, filed on May 8, 2020.

(30) Foreign Application Priority Data

Jul. 30, 2019 (CN) .......................... 201910693057.7

(51) Int. Cl.
H02J 5/00 (2016.01)
H02J 1/00 (2006.01)
(Continued)

(52) U.S. Cl.
CPC .................................... H02J 5/00 (2013.01); H02J 1/00 (2013.01); H02J 3/0012 (2020.01); H02J 9/061 (2013.01)

(58) Field of Classification Search
CPC .... H02J 5/00; H02J 3/0012; H02J 1/00; H02J 9/061; H02J 3/00; H02J 9/06
See application file for complete search history.

(56) References Cited

U.S. PATENT DOCUMENTS

2008/0103630 A1 5/2008 Eckroad
2016/0218558 A1 7/2016 Qin et al.

FOREIGN PATENT DOCUMENTS

CA 2393102 C * 1/2007 .............. H02J 1/102
CN 101702097 A 5/2010
(Continued)

OTHER PUBLICATIONS

Extended European Search Report issued in European Application No. 20846013.9 dated Sep. 29, 2022, 7 pages.
(Continued)

Primary Examiner — Robert L Deberadinis
(74) Attorney, Agent, or Firm — Fish & Richardson P.C.

(57) ABSTRACT

This application provide a power supply device and a control method. In one example, a power supply device includes a first AC/DC unit and a second AC/DC unit. An input terminal of the first AC/DC unit and an input terminal of the second AC/DC unit are connected to an alternating current input bus. An output terminal of the first AC/DC unit is connected to a first direct current output bus. The first AC/DC unit is output stable. An output terminal of the second AC/DC unit is connected to a second direct current output bus. Power is output to a plurality of direct current output buses respectively through a plurality of AC/DC units to supply power to different loads.

20 Claims, 5 Drawing Sheets

(51) Int. Cl.
*H02J 3/00* (2006.01)
*H02J 9/06* (2006.01)

(56) References Cited

FOREIGN PATENT DOCUMENTS

| CN | 104065281 A | 9/2014 |
| CN | 104333122 A | 2/2015 |
| CN | 104682375 A | 6/2015 |
| CN | 107947148 A | 4/2018 |
| CN | 109245087 A | 1/2019 |
| JP | 2015128354 A | 7/2015 |

OTHER PUBLICATIONS

Office Action issued in Chinese Application No. 201910693057.7 dated Mar. 2, 2022, 7 pages.
PCT International Search Report and Written Opinion issued in International Application No. PCT/CN2020/089209 dated Jul. 20. 2020, 15 pages (with English translation).

* cited by examiner

POWER SUPPLY DEVICE AND CONTROL METHOD

CROSS-REFERENCE TO RELATED APPLICATIONS

This application is a continuation of International Application No. PCT/CN2020/089209, filed on May 8, 2020, which claims priority to Chinese Patent Application No. 201910693057.7, filed on Jul. 30, 2019. The disclosures of the aforementioned applications are incorporated herein by reference in these entireties.

TECHNICAL FIELD

This application relates to the power supply field, and more specifically, to power supply device and control method.

BACKGROUND

With development of communication technologies in a fifth generation (5G) system, a quantity of sites increases sharply due to deeper site coverage and larger hotspot coverage. In addition, power consumption of 5G communication devices is high. Therefore, a fast and simple deployment of site power systems and energy saving and consumption reduction become two challenges.

A high-power base station device has problems such as an insufficient remote capability and a large line loss. In a conventional technology, the foregoing problems are usually resolved by boosting a voltage of a power supply bus. However, voltage boost requirements of different remote loads are different, and an existing power system cannot separately adjust voltages for different output loads. Consequently, voltage boosting space of the power supply bus is limited, and power supply efficiency is low.

SUMMARY

Embodiments of this application provide a power supply device and a control method to separately supply power to different loads and optimize terminal-to-terminal efficiency.

According to a first aspect, a power supply device is provided. The power supply device includes: a first alternating current/direct current AC/DC unit, where an input terminal of the first AC/DC unit is connected to an alternating current input bus, and an output terminal of the first AC/DC unit is connected to a first direct current output bus; and a second AC/DC unit, where an input terminal of the second AC/DC unit is connected to the alternating current input bus, and an output terminal of the second AC/DC unit is connected to a second direct current output bus.

According to the solution in this embodiment of this application, power is output to a plurality of direct current output buses through a plurality of AC/DC units. The plurality of direct current output buses can output power independently, and respectively supply power to different types of loads. In such a multi-bus power supply solution, corresponding direct current output bus voltages can be configured for different types of loads.

In addition, for a long-distance load, boosting a voltage can reduce a line loss. Different loads have different voltage boost requirements. Such a multi-bus solution can satisfy voltage boost requirements of different loads, reduce a line loss, optimize terminal-to-terminal efficiency, and improve a remote capability.

With reference to the first aspect, in some implementations of the first aspect, a voltage of the first direct current output bus is different from a voltage of the second direct current output bus.

With reference to the first aspect, in some implementations of the first aspect, the second AC/DC unit is output adjustable; and the power supply device further includes a first controller, where the first controller is configured to: determine a direct current voltage of the second direct current output bus, and adjust the second AC/DC unit based on the direct current voltage.

According to the solution in this embodiment of this application, a corresponding direct current output bus voltage can be flexibly configured based on a requirement by using the output adjustable AC/DC unit. When a load changes, the direct current output bus voltage can be adjusted in time, the line loss is reduced, and the remote capability is improved.

With reference to the first aspect, in some implementations of the first aspect, the power supply device further includes a bidirectional direct current/direct current DC/DC unit, where the bidirectional DC/DC unit is connected between the first direct current output bus and the second direct current output bus.

With reference to the first aspect, in some implementations of the first aspect, the power supply device further includes a second controller, where the second controller is configured to: when determining that the first AC/DC unit is faulty, enable the bidirectional DC/DC unit, to supply power to the first direct current output bus through the second direct current output bus.

According to the solution in this embodiment of this application, fault compensation between the direct current output buses can be achieved by controlling the bidirectional DC/DC unit, thereby further improving power supply reliability.

With reference to the first aspect, in some implementations of the first aspect, the power supply device further includes a third controller, where the third controller is configured to: when determining that a power supply capability of the first direct current output bus is less than a load requirement, enable the bidirectional DC/DC unit, to control power compensation between the first direct current output bus and the second direct current output bus.

According to the solution in this embodiment of this application, energy scheduling between the direct current output buses can be implemented by controlling the bidirectional DC/DC unit, a problem of insufficient power configuration utilization of a device at an existing site is resolved, power complementation in a scenario with a low probability peak is implemented, a low-power single-channel configuration is implemented, and design costs are reduced. In addition, the power scheduling can increase a single-point fault tolerance rate and improve the power supply reliability.

With reference to the first aspect, in some implementations of the first aspect, the first AC/DC unit is an output stable AC/DC unit; and the power supply device further includes a battery backup unit, where a direct current output terminal of the battery backup unit is connected to the first direct current output bus.

With reference to the first aspect, in some implementations of the first aspect, the power supply device further includes a fourth controller, where the fourth controller is configured to: when determining that the bidirectional DC/DC unit is faulty, control the second AC/DC unit, so that the direct current voltage of the second direct current output bus is equal to a voltage of the first direct current output bus.

With reference to the first aspect, in some implementations of the first aspect, the power supply device further includes a fifth controller, where the fifth controller is configured to: when determining that the alternating current input bus is faulty, enable the bidirectional DC/DC unit, so that the battery backup unit supplies power to the second direct current output bus.

According to the solution in this embodiment of this application, the direct current output buses can share one battery backup unit, central power backup and central management can be implemented by controlling the bidirectional DC/DC unit, and an occupied area is reduced.

The first controller, the second controller, the third controller, the fourth controller, and the fifth controller may be a same controller.

According to a second aspect, a control method for a power supply device is provided. The power supply device includes a first AC/DC unit, a second AC/DC unit, a bidirectional direct current/direct current DC/DC unit, and a battery backup unit; and an input terminal of the first AC/DC unit is connected to an alternating current input bus, an output terminal of the first AC/DC unit is connected to a first direct current output bus, the first AC/DC unit is an output stable AC/DC unit, an input terminal of the second AC/DC unit is connected to the alternating current input bus, an output terminal of the second AC/DC unit is connected to a second direct current output bus, the second AC/DC unit is output adjustable, the bidirectional DC/DC unit is connected between the first direct current output bus and the second direct current output bus, and a direct current output terminal of the battery backup unit is connected to the first direct current output bus.

The method includes:
determining that the first AC/DC unit is faulty; and
enabling the bidirectional DC/DC unit, to supply power to the first direct current output bus through the second direct current output bus.

With reference to the second aspect, in some implementations of the second aspect, the method further includes:
determining that the second AC/DC unit is faulty; and
enabling the bidirectional DC/DC unit, to supply power to the second direct current output bus through the first direct current output bus.

According to the solution provided in this embodiment of this application, power is output to a plurality of direct current output buses through a plurality of AC/DC units. The plurality of direct current output buses can output power independently, and respectively supply power to different types of loads. In such a multi-bus power supply solution, corresponding direct current output bus voltages can be configured for different types of loads.

In addition, for a long-distance load, boosting a voltage can reduce a line loss. Different loads have different voltage boost requirements. Such a multi-bus solution can satisfy voltage boost requirements of different loads, reduce a line loss, optimize terminal-to-terminal efficiency, and improve a remote capability.

In addition, fault compensation between the direct current output buses can be achieved by controlling the bidirectional DC/DC unit, thereby further ensuring stable power supply.

With reference to the second aspect, in some implementations of the second aspect, the method further includes: determining that a power supply capability of the first direct current output bus is less than a load requirement; and enabling the bidirectional DC/DC unit, to control power compensation between the first direct current output bus and the second direct current output bus.

With reference to the second aspect, in some implementations of the second aspect, the method further includes: determining that a power supply capability of the second direct current output bus is less than the load requirement; and enabling the bidirectional DC/DC unit, to control power compensation between the first direct current output bus and the second direct current output bus.

According to the solution provided in this embodiment of this application, energy scheduling between the direct current output buses can be implemented by controlling the bidirectional DC/DC unit, a problem of insufficient power configuration utilization of a device at an existing site is resolved, power complementation in a scenario with a low probability peak is implemented, a low-power single-channel configuration is implemented, and design costs are reduced. In addition, the power scheduling can increase a single-point fault tolerance rate and improve the power supply reliability.

With reference to the second aspect, in some implementations of the second aspect, the method further includes: determining that the bidirectional DC/DC unit is faulty; and bypassing the bidirectional DC/DC unit, and adjusting the second AC/DC unit, so that a direct current voltage of the second direct current output bus is the same as a direct current voltage of the first direct current output bus.

With reference to the second aspect, in some implementations of the second aspect, the method further includes: determining that the alternating current input bus is faulty; and enabling the bidirectional DC/DC unit, so that the battery backup unit supplies power to the second direct current output bus.

According to the solution in this embodiment of this application, the direct current output buses can share one battery backup unit, central power backup and central management can be implemented by controlling the bidirectional DC/DC unit, and an occupied area is reduced.

DESCRIPTION OF EMBODIMENTS

The following describes technical solutions in embodiments of this application with reference to the accompanying drawings.

The technical solutions in the embodiments of this application may be applied to a system in which power needs to be separately supplied to loads with different voltages, for example, a new deployment scenario or a superposition scenario of a future fifth generation (5G) system.

Figure 1:
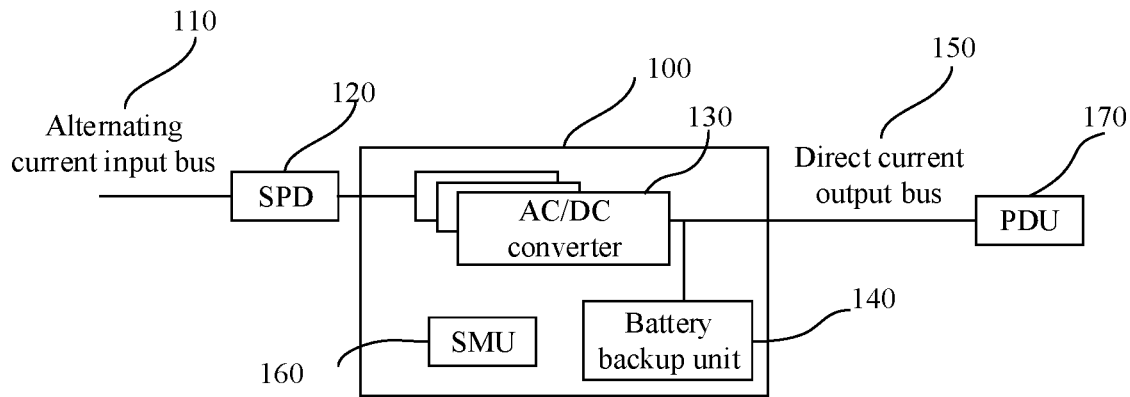
FIG. 1 is a schematic diagram of a single-bus power supply device.

A power system of a second generation system (2G)/third generation system (3G)/fourth generation system (4G) is a single-bus power supply device. FIG. 1 is a schematic architectural diagram of a single-bus power supply device 100.

As shown in FIG. 1, an alternating current input bus 110 is connected to a plurality of alternative current/direct current (AC/DC) converters 130 through a surge protective device (SPD) 120. The SPD 120 may also be referred to as a surge protection box. The plurality of AC/DC converters 130 are connected in parallel to output power, and are combined with a direct current output bus 150 together with a battery backup unit 140. Power is supplied to all loads through a power distribution unit (PDU) 170. The single-bus power supply device may be managed by a system management unit (SMU) 160.

When a 5G power system is deployed, because power consumption of a 5G device is high, a voltage boosting power supply is usually used to reduce a line loss.

Figure 2:
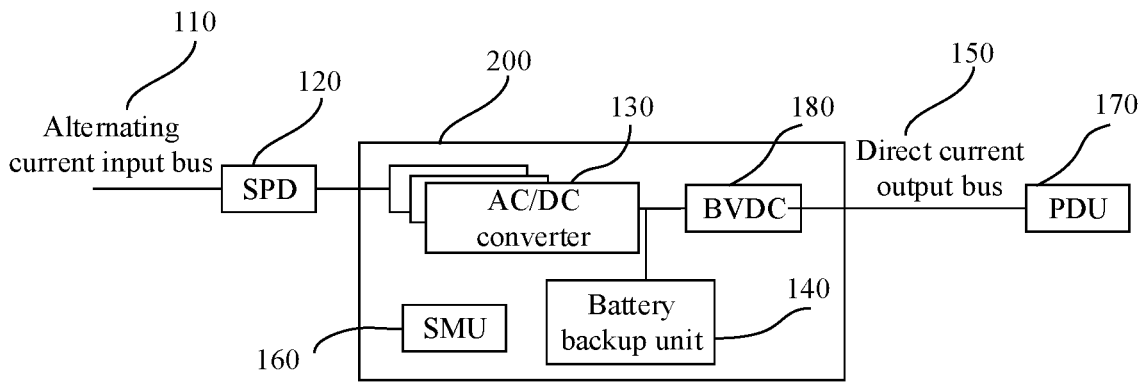
FIG. 2 is a schematic diagram of a boost power supply device.

In a scenario in which a capacity of the single-bus power supply device is sufficient, a voltage booster circuit may be directly added to the direct current output bus of the single-bus power supply device to supply power to a 5G device. FIG. 2 is a schematic diagram of a single-bus boosted power supply device 200. In the boosted voltage device 200, a boosted voltage direct current (BVDC) unit 180 is added to a single-bus power supply device 100, and is connected in series between an output of an AC/DC converter 130 and a power distribution unit PDU 170. The BVDC 180 boosts a voltage of a direct current output bus 150 to a required voltage.

For a scenario in which a capacity of the single-bus power supply device is insufficient, an AC/DC converter and a BVDC are superposed on the single-bus power supply device, that is, a voltage of a bus is not boosted, and a single-bus power supply device with a higher direct current output bus voltage is obtained. The direct current output bus voltage is higher than the −48 V direct current output bus voltage of a 2/3/4G power system.

However, all loads are powered by one bus, voltages cannot be adjusted for different types of loads separately, the voltages can only be boosted together, and boost space is limited. This is not conducive to reducing a line loss, and optimal terminal-to-terminal efficiency of a single load cannot be achieved. In addition, because the BVDC 180 is connected in series with the direct current output bus 150 to supply power to a 5G device, a fault point is added to the direct current output bus 150, power supply reliability is reduced, and a loss and costs of the BVDC module are increased.

Figure 3:
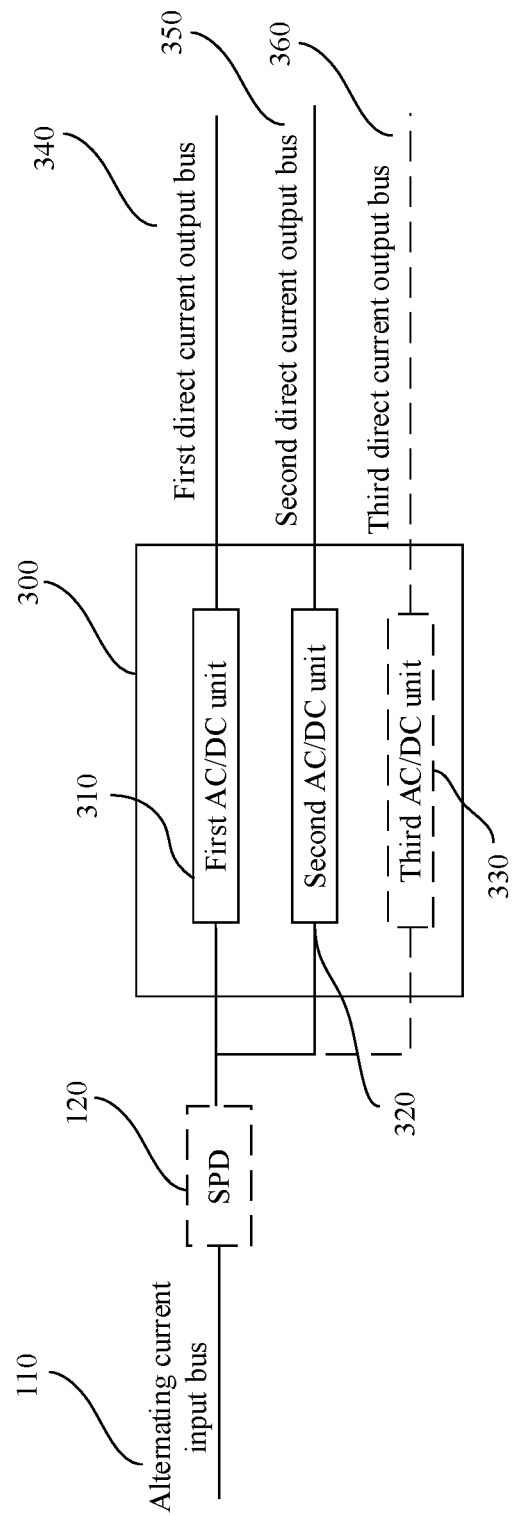
FIG. 3 is a schematic diagram of a power supply device according to an embodiment of this application.

FIG. 3 is a schematic diagram of a power supply device 300 according to an embodiment of this application. The power supply device 300 in FIG. 3 includes a first AC/DC unit 310 and a second AC/DC unit 320. An input terminal of the first AC/DC unit 310 is connected to an alternating current input bus 110. An output terminal of the first AC/DC unit 310 is connected to a first direct current output bus 340. An input terminal of the second AC/DC unit 320 is connected to the alternating current input bus 110. An output terminal of the second AC/DC unit 320 is connected to a second direct current output bus 350.

The first AC/DC unit 310 and the second AC/DC unit 320 may be any units that can implement conversion from an alternating current to a direct current, for example, may be AC/DC converters. In addition, a quantity of AC/DC converters included in each AC/DC unit is not limited in this embodiment of this application. For example, the AC/DC unit may include one AC/DC converter, or may include a plurality of AC/DC converters that are connected in parallel.

It should be noted that the solution in this embodiment of this application is not limited to two AC/DC units, and may further include another AC/DC unit. The another AC/DC unit may be similar to the first AC/DC unit 310 and the second AC/DC unit 320. An input terminal of the another AC/DC unit may be connected to the alternating current input bus, and an output terminal of the another AC/DC unit is connected to different direct current output buses. For example, the power supply device 300 may further include a third AC/DC unit 330. An input terminal of the third AC/DC unit 330 is connected to the alternating current input bus 110, and an output terminal of the third AC/DC unit 330 is connected to a third direct current output bus 360.

The direct current output buses may be respectively connected to corresponding power distribution units PDUs or loads, in other words, the direct current output buses may directly supply power to the loads, or may supply power to the loads through the power distribution units PDUs.

According to the solution in this embodiment of this application, power is output to a plurality of direct current output buses through a plurality of AC/DC units. The plurality of direct current output buses can output power independently, and respectively supply power to different types of loads. In such a multi-bus power supply solution, corresponding direct current output bus voltages can be configured for different types of loads.

In addition, for a long-distance load, boosting a voltage can reduce a line loss. Different loads have different voltage boost requirements. For example, for a remote load, to reduce a line loss, a voltage boost requirement of the remote load is high. In a single-bus power supply solution, boost space is limited, for example, limited by a withstand voltage of a load. The line loss cannot be better reduced if the boost space is limited. Such a multi-bus solution provided in this embodiment of this application can satisfy voltage boost requirements of different loads, is not limited by a load on another direct current output bus, and can better reduce the line loss, optimize terminal-to-terminal efficiency, and improve a remote capability.

In addition, compared with a voltage boosting manner of introducing a boosted voltage unit on a bus, the solution in this embodiment of this application does not introduce another unit, that is, no fault point is introduced on the bus, thereby ensuring power supply reliability and reducing design costs.

It should be understood that the input terminals of the first AC/DC unit 310 and the second AC/DC unit 320 are connected to the alternating current input bus 110. The connection relationship is not limited to a direct connection between the AC/DC units and the alternating current input bus 110, but may be an indirect connection between the alternating current input bus 110 and the AC/DC units through another module. For example, the alternating current input bus may be connected to the AC/DC units through the SPD 120. A position relationship of the SPD 120 in FIG. 3 is merely an example. For example, the surge protective device 120 may alternatively be disposed in the power supply device 300.

The output terminals of the first AC/DC unit 310 and the second AC/DC unit 320 are respectively connected to two direct current output buses. The connection relationship is not limited to a direct connection between the AC/DC units and the direct current output bus, but may be an indirect connection between the AC/DC units and the direct current output bus through another module.

Voltages of the first direct current output bus 340 and the second direct current output bus 350 may be configured based on different loads. To be specific, an output voltage of the first direct current output bus 340 may be the same as or may be different from an output voltage of the second direct current output bus 350.

The AC/DC unit may include an output stable AC/DC unit and/or an output adjustable AC/DC unit. For example, the first AC/DC unit 310 may be an output stable AC/DC unit, and the second AC/DC unit 320 may be an output adjustable AC/DC unit. The power supply device may further include a first controller. The first controller may be configured to control the second AC/DC unit. It should be noted that the first controller and the second AC/DC unit 320 may be disposed separately, or may be integrated together. For example, the first controller is integrated in the second AC/DC unit 320. The first controller may be configured to: determine a direct current voltage of the second direct current output bus 350, and adjust the second AC/DC unit 320 based on the direct current voltage. If the power supply device further includes the third AC/DC unit 330, the third AC/DC unit 330 may be an output adjustable AC/DC unit. The first controller may further be configured to control the third AC/DC unit 330. The first controller may be configured to: determine a direct current voltage of the third direct current output bus 360, and adjust the third AC/DC unit 330 based on the direct current voltage. Certainly, the third AC/DC unit 330 may alternatively be controlled by another controller.

As an example rather than limitation, the first controller may determine the direct current voltage of the second direct current output bus 350 based on a signal sent by a load on the second direct current output bus 350. For example, the signal sent by the load includes a withstand voltage of the load. The first controller may determine the direct current voltage of the second direct current output bus 350 as the withstand voltage of the load, and further adjust an output of the second AC/DC unit 320, so that the output of the second AC/DC unit 320 reaches the withstand voltage. Certainly, the first controller may alternatively determine the direct current voltage of the second direct current output bus 350 in another manner, for example, determine the direct current voltage of the second direct current output bus 350 based on a preset algorithm.

According to the solution in this embodiment of this application, a corresponding direct current output bus voltage can be flexibly configured based on a requirement by using the output adjustable AC/DC unit. When a load changes, the direct current output bus voltage can be adjusted in time, the line loss is reduced, and the remote capability is improved.

A power of the single-bus power supply device needs to be configured based on a sum of all load peak powers. That is, a total configured power of AC/DC converters needs to be greater than the sum of all the load peak powers. However, most devices on a live network work at less than 50% of a rated power. Each load device works at a peak power only at a very low probability. As a result, AC/DC configurations are "redundant".

Figure 4:
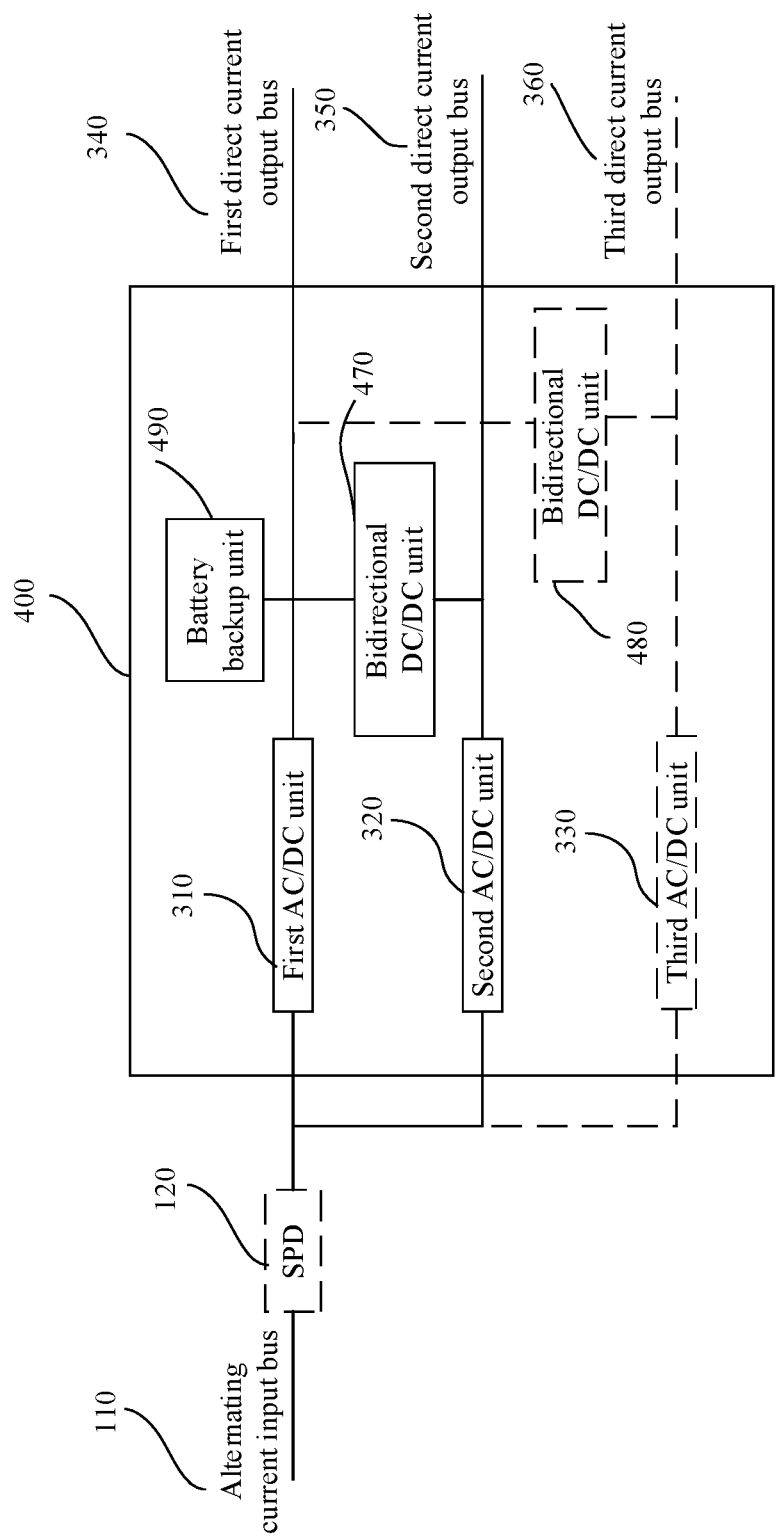
FIG. 4 is a schematic diagram of a power supply device according to another embodiment of this application.

Therefore, FIG. 4 is a schematic diagram of a power supply device 400 according to an embodiment of this application. On the basis of the power supply device 300, the solution in this embodiment of this application further includes a bidirectional direct current/direct current (DC/DC) unit 470. The bidirectional DC/DC unit 470 is connected between a first direct current output bus 340 and a second direct current output bus 350. The power supply device 400 in this embodiment of this application may further include another AC/DC unit and a plurality of bidirectional DC/DC units. In this case, the bidirectional DC/DC unit may be connected between the first direct current output bus and another direct current output bus. For example, as shown in FIG. 4, the power supply device 400 in this embodiment of this application may further include a third AC/DC unit 330 and a bidirectional DC/DC unit 480. An input terminal of the third AC/DC unit 330 is connected to an alternating current input bus 110, and an output terminal of the third AC/DC unit 330 is connected to a third direct current output bus 360. The bidirectional DC/DC unit 480 is connected between the first direct current output bus 340 and the third direct current output bus 360. Certainly, the plurality of bidirectional DC/DC units may alternatively be connected between the second direct current output bus and the another direct current output bus. In other words, a plurality of direct current output buses may be connected to each other through a plurality of bidirectional DC/DC units.

It should be noted that the bidirectional DC/DC unit may be any device that can implement bidirectional direct current conversion. For example, the bidirectional DC/DC unit may be a bidirectional DC/DC converter. In addition, a quantity of bidirectional DC/DC converters included in each bidirectional DC/DC unit is not limited in this embodiment of this application. For example, a bidirectional DC/DC unit may include one bidirectional DC/DC converter, or may include a plurality of bidirectional DC/DC converters that are connected in parallel.

The power supply device 400 in this embodiment of this application may further include a second controller. The second controller may be configured to control the bidirectional DC/DC unit to implement fault compensation between the direct current output buses. Further, when any AC/DC unit is faulty (if a plurality of AC/DC converters are connected in parallel in the AC/DC unit, all the AC/DC converters in the AC/DC unit are faulty), the faulty AC/DC unit may be isolated, and a bidirectional DC/DC unit connected to the faulty AC/DC unit is enabled, so that another direct current output bus connected to the bidirectional DC/DC unit supplies, through the bidirectional DC/DC unit, power to a load on a direct current output bus corresponding to the faulty AC/DC unit.

An example in which the power supply device 400 includes a first AC/DC unit 310 and a second AC/DC unit 320 is used for description. When determining that the first AC/DC unit 310 or the second AC/DC unit 320 is faulty, the second controller enables the bidirectional DC/DC unit 470, to supply, through a direct current output bus connected to an AC/DC unit that is not faulty, power to a direct current output bus connected to the faulty AC/DC unit. For example, when determining that the first AC/DC unit 310 is faulty, the second controller isolates the first AC/DC unit 310 and enables the bidirectional DC/DC unit 470, to supply power to the first direct current output bus 340 through the second direct current output bus 350. For another example, when determining that the second AC/DC unit 320 is faulty, the second controller isolates the second AC/DC unit 320 and enables the bidirectional DC/DC unit 470, to supply power to the second direct current output bus 350 through the first direct current output bus 340.

Another example in which the power supply device 400 further includes a third AC/DC unit 330 is used for description. As shown in FIG. 4, when determining that the third AC/DC unit 330 is faulty, the second controller isolates the third AC/DC unit 330 and enables the bidirectional DC/DC unit 480, to supply power to a third direct current output bus 360 through the first direct current output bus 330. For another example, when determining that the first AC/DC unit 310 is faulty, the second controller isolates the first AC/DC unit 310 and enables the bidirectional DC/DC unit 470 or the bidirectional DC/DC unit 480, to supply power to the first direct current output bus 330 through the second direct current output bus 350 or the third direct current output bus 360.

According to the solution in this embodiment of this application, fault compensation between the direct current output buses can be achieved by controlling the bidirectional DC/DC unit, thereby further improving power supply reliability.

The power supply device may further include a third controller. The third controller may be configured to control the bidirectional DC/DC unit to implement power compensation between the direct current output buses. Further, an extra power of a direct current output bus may be provided for another direct current output bus by controlling the bidirectional DC/DC unit. When a power of any direct current output bus is insufficient, that is, when a power supply capability of the direct current output bus is less than a load requirement, a direct current voltage of the direct current output bus decreases, and the third controller enables a bidirectional DC/DC unit connected to the direct current output bus, so that another direct current output bus connected to the enabled bidirectional DC/DC unit compensates a power for the direct current output bus with an insufficient power through the bidirectional DC/DC unit.

An example in which the power supply device includes a first AC/DC unit 310 and a second AC/DC unit 320 is used for description. When determining that a power supply capability of a direct current output bus is less than a load requirement, the third controller enables the bidirectional DC/DC unit 470, to control power compensation between the first direct current output bus 340 and the second direct current output bus 350. As an example rather than limitation, when the third controller determines that a power supply capability of the second direct current output bus 350 is less than a load requirement, for example, the third controller monitors a decrease of an output voltage of the second AC/DC unit 320, the third controller enables the bidirectional DC/DC unit 470, to control the first direct current output bus 340 to transfer energy to the second direct current output bus 350 for power compensation.

Another example in which the power supply device 400 further includes a third AC/DC unit 330 is used for description. As shown in FIG. 4, when the third controller determines that a power supply capability of the first direct current output bus 340 is less than the load requirement, for example, the third controller monitors a decrease of an output voltage of the first AC/DC unit 310, the third controller enables the bidirectional DC/DC unit 470 or the bidirectional DC/DC unit 480, to control the second direct current output bus 350 or the third direct current output bus 360 to transfer energy to the first direct current output bus 340 for power compensation.

According to the solution in this embodiment of this application, a problem of insufficient power configuration utilization of a device at an existing site is resolved, and energy between the buses can be scheduled, power complementation in a scenario with a low probability peak power is implemented, a low-power single-channel configuration is implemented, and design costs are reduced. In addition, the power scheduling can increase a single-point fault tolerance rate and improve power supply reliability.

In addition, as described above, an output voltage of a battery backup unit of a 2/3/4G power system is −48 V. For a scenario in which a capacity of a single-bus power supply device is insufficient, a power supply device with a direct current voltage higher than that of the single-bus power supply device is provided. In this case, a battery backup unit of the single-bus power supply device cannot be used, and independent power backup and independent management are required. For a power device including different direct current output bus voltages, if power backup, management, and a system are independent, in other words, a battery backup unit is configured for each direct current output bus, there are too many components and an occupied space is large when a site is superposed or newly built.

As shown in FIG. 4, this embodiment of this application may include a battery backup unit 490. The battery backup unit 490 may be connected to any direct current output bus. For example, when the first AC/DC unit 310 is an output stable AC/DC unit, a direct current output terminal of the battery backup unit 490 may be connected to the first direct current output bus 340, and remaining direct current output buses are separately connected to the first direct current output bus 340 through the bidirectional DC/DC unit. An output voltage of the battery backup unit 490 may be the same as a direct current voltage of the first direct current output bus 340. The battery backup unit 490 directly backs up power for the first direct current output bus 340, and backs up power for another direct current output bus through the bidirectional DC/DC unit. For another example, when the second AC/DC unit 320 is an output adjustable AC/DC unit, the battery backup unit may be connected to the second direct current output bus through an additional bidirectional DC/DC unit, and remaining direct current output buses may be separately connected to the second direct current output bus through the bidirectional DC/DC unit. The battery backup unit 490 may back up power for different direct current output buses through the bidirectional DC/DC unit.

Therefore, the direct current output buses can share one battery backup unit, central power backup and central management can be implemented by controlling the bidirectional DC/DC unit.

The power supply device may further include a fourth controller. An example in which the power supply device 400 includes the first AC/DC unit 310 and the second AC/DC unit 320 is used for description. The first direct current output bus 340 may be output stable (in other words, the first AC/DC unit 310 is output stable). The battery backup unit 490 may be connected to the first direct current output bus 340. The fourth controller may be configured to: when determining that the bidirectional DC/DC unit 470 is faulty, bypass the bidirectional DC/DC unit 470, and control the second AC/DC unit 320, so that the direct current voltage of the second direct current output bus 350 is equal to a voltage of the first direct current output bus 340. As an example rather than limitation, when the power supply device further includes another AC/DC unit and a plurality of bidirectional DC/DC units, the first direct current output bus 340 may be output stable (in other words, the first AC/DC unit 310 is output stable), the battery backup unit 490 may be connected to the first direct current output bus 340, and other direct current output buses may be separately connected to the first direct current output bus through the plurality of bidirectional DC/DC units. When a bidirectional DC/DC unit is faulty, the bidirectional DC/DC unit may be bypassed. In addition, the AC/DC unit is adjusted, so that a voltage of a direct current output bus connected to the bidirectional DC/DC unit is the same as the voltage of the first direct current output bus and stays constant. In this way, the direct current output bus corresponding to the faulty bidirectional DC/DC unit can still share the battery backup unit, thereby improving power supply stability.

Another example in which the power supply device 400 further includes a third AC/DC unit 330 is used for description. As shown in FIG. 4, the first direct current output bus 340 may be output stable (in other words, the first AC/DC unit 310 is output stable). The battery backup unit 490 may be connected to the first direct current output bus 340. The fourth controller may be configured to: when determining that the bidirectional DC/DC unit 480 is faulty, bypass the bidirectional DC/DC unit 480, and control the third AC/DC unit 330, so that the direct current voltage of the third direct current output bus 360 is equal to the direct current voltage of the first direct current output bus 340 and stays constant. In this way, the faulty third direct current output bus can still share the battery backup unit, thereby improving power supply stability.

The power supply device may further include a fifth controller. The fifth controller is configured to: when determining that the alternating current input bus is faulty, enable the bidirectional DC/DC unit, so that the battery backup unit can supply power to each direct current output bus.

An example in which the power supply device 400 includes the first AC/DC unit 310 and the second AC/DC unit 320 is used for description. The first direct current output bus 340 may be output stable (in other words, the first AC/DC unit 310 is output stable). The battery backup unit 490 may be connected to the first direct current output bus 340. The fifth controller may be configured to: when determining that the alternating current input bus 110 is faulty, enable the bidirectional DC/DC unit 470, so that the battery backup unit 490 can supply power to the second direct current output bus 350. Certainly, in this case, the battery backup unit 490 may directly supply power to the first direct current output bus 340. As an example rather than limitation, when the power supply device further includes another AC/DC unit and a plurality of bidirectional DC/DC units, the first direct current output bus 340 may be output stable (in other words, the first AC/DC unit 310 is output stable), the battery backup unit 490 may be connected to the first direct current output bus 340, and other direct current output buses may be separately connected to the first direct current output bus through the plurality of bidirectional DC/DC units. When the alternating current input bus is faulty, all bidirectional DC/DC units may be enabled, so that the battery backup unit supplies power to each direct current output bus through each bidirectional DC/DC unit.

According to the solution in this embodiment of this application, the direct current output buses can share one battery backup unit, central power backup and central management can be implemented by controlling the bidirectional DC/DC unit, and an occupied area is reduced.

It should be understood that in the solution in this embodiment of this application, the first controller, the second controller, the third controller, the fourth controller, and the fifth controller may be a same controller, or may be different controllers. As an example rather than limitation, the AC/DC unit, the bidirectional DC/DC unit, and the controller may all be inserted into a subrack and transmit signals through a backplane of the subrack. The AC/DC unit and the bidirectional DC/DC unit may transmit voltage and current signals, warning information, and the like to a controller through the backplane. The controller may send commands such as voltage adjustment and switching on and off to the AC/DC unit and the bidirectional DC/DC unit through the backplane.

Figure 5:
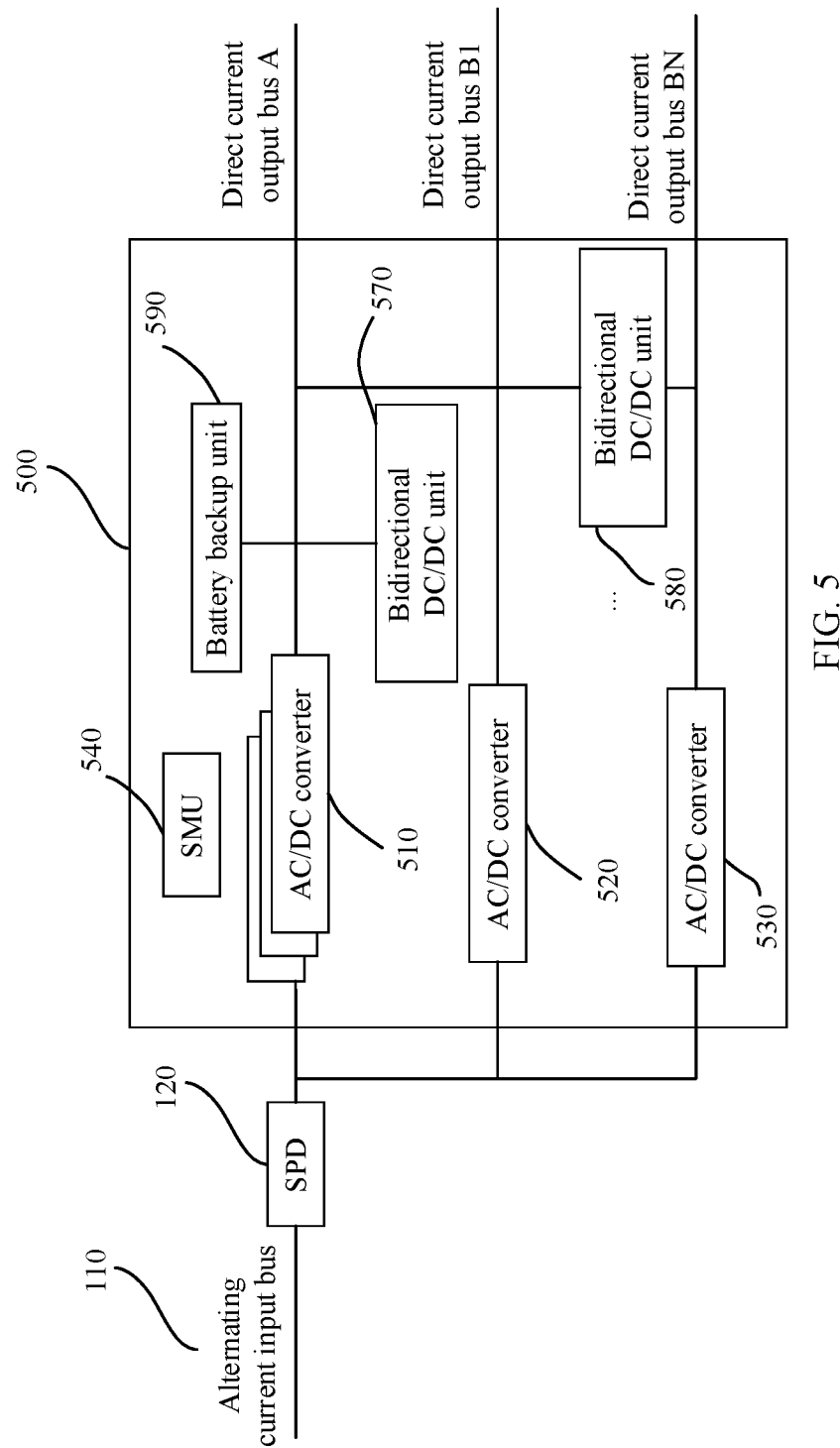
FIG. 5 is a schematic diagram of a power supply device according to another embodiment of this application.

In the following, for ease of understanding and description, an example in which a plurality of direct current output buses share a power supply device of a battery backup unit is used to describe the power supply device and the control method in the embodiments of this application in detail. FIG. 5 is a schematic diagram of a power supply device 500 according to another embodiment of this application.

The power supply device 500 includes a plurality of AC/DC units. An alternating current input bus 110 is divided by a surge protection box SPD 120 into a plurality of buses to connect to the AC/DC units. A first AC/DC unit is M output stable AC/DC converters 510 connected in parallel in the figure, where M ≥2 and M is a positive integer. An output terminal of the first AC/DC unit is connected to a direct current output bus A (which is an example of a first direct current output bus). A second AC/DC unit is an output adjustable AC/DC converter 520. An output terminal of the second AC/DC unit is connected to a direct current output bus B1 (which is an example of a second direct current output bus). The power supply device further includes another AC/DC unit, for example, an output adjustable AC/DC converter 530 in FIG. 5. An output terminal of the AC/DC converter 530 is connected to a direct current output bus BN. Each direct current output bus is connected to a corresponding power distribution unit PDU or load. A battery backup unit 590 is connected to the direct current output bus A. The direct current output bus A is connected to each of other direct current output buses through a bidirectional DC/DC unit. For example, the direct current output bus A is connected to the direct current output bus B1 through a bidirectional DC/DC unit 570, and the direct current output bus A is connected to the direct current output bus BN through a bidirectional DC/DC unit 580. A monitoring unit SMU 540 (which is an example of a controller) is responsible for managing works of each module in a system. For example, the output adjustable AC/DC converters and the bidirectional DC/DC units all may be controlled by the monitoring unit SMU 540. In other words, the monitoring unit SMU 540 may be simultaneously used as a first controller, a second controller, a third controller, a fourth controller, and a fifth controller.

A voltage of the direct current output bus A may be a −48 V bus voltage of a 2/3/4G power system, and is powered by a conventional communication power source, for example, may be connected to a conventional communication device such as a baseband unit (BBU) or a 2\3\4G communication device. The battery backup unit may be a backup battery. Other direct current output buses each may supply power to an independent base station device.

That the monitoring unit SMU 540 manages works of each module in a power supply device may specifically include the following operations:

(1) Control an output voltage of an output adjustable AC/DC converter to optimize terminal-to-terminal efficiency on a corresponding direct current output bus.

(2) Control all the bidirectional DC/DC units to implement functions such as power compensation, fault compensation, and power backup between all the direct current output buses.

The power compensation between all the direct current output buses is specifically: When an output power of the direct current output bus A is insufficient, extra powers of the direct current output buses B1 to BN may be supplied to the direct current output bus A through the bidirectional DC/DC units; and when a power of any one of the direct current output buses B1 to BN is insufficient, the direct current output bus A may compensate a power for the direct current output bus with an insufficient power through the bidirectional DC/DC unit.

The fault compensation between all the direct current output buses specifically includes: When any AC/DC converter other than the AC/DC converter 510 on the direct current output bus A is faulty, fault isolation may be performed, a bidirectional DC/DC unit connected to the faulty AC/DC converter is enabled, and the direct current output bus A supplies, through the bidirectional DC/DC unit, power to a load on the direct current output bus connected to the faulty AC/DC converter; and when the M AC/DC converters 510 on the direct current output bus A are all faulty, any bidirectional DC/DC unit may be enabled, and another direct current output bus supplies power to a load on the direct current output bus A through the bidirectional DC/DC unit.

(3) Control all the bidirectional DC/DC units and AC/DC converters to implement central power backup.

The central power backup means that all the direct current output buses share one battery backup unit. The battery backup unit 590 is connected to the direct current output bus A, directly backs up power for the direct current output bus A, and backs up power for other direct current output buses through the bidirectional DC/DC units.

Further, when a bidirectional DC/DC unit is faulty, the bidirectional DC/DC unit is bypassed, and an output voltage of an AC/DC converter (not the AC/DC converter connected to the battery backup unit side) connected to the bidirectional DC/DC unit is adjusted, so that the output voltage keeps consistent with a direct current voltage of the direct current output bus A, to ensure that the direct current output bus can share the battery backup unit.

In addition, when the alternating current input bus is faulty, the bidirectional DC/DC unit is enabled, so that the battery backup unit supplies power to each direct current output bus.

Figure 6:
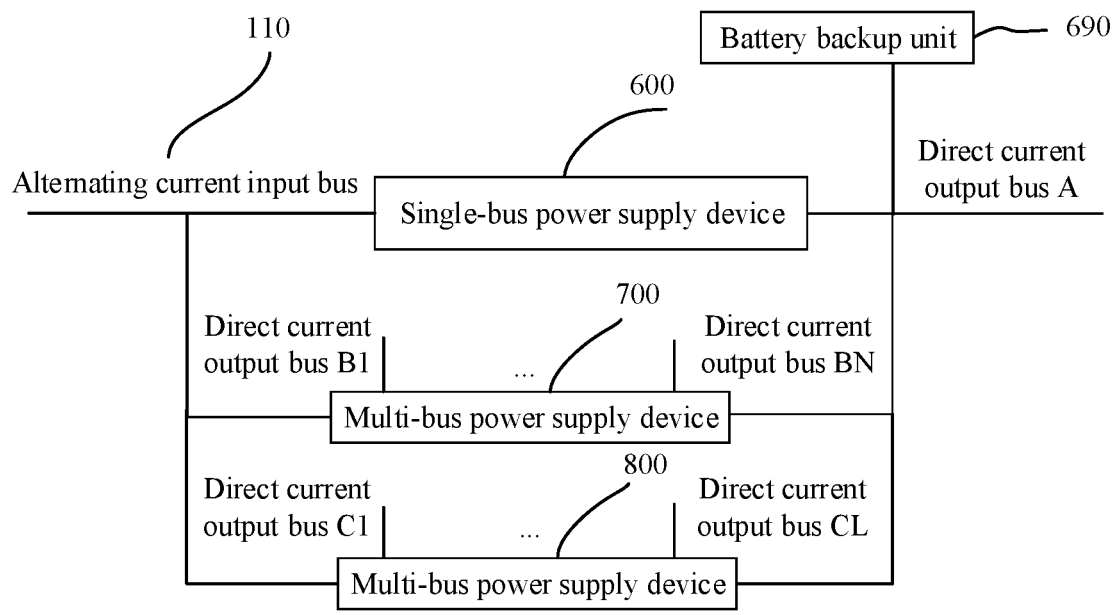
FIG. 6 is a schematic diagram showing that a power supply device is superposed on a single-bus power supply device according to an embodiment of this application.

The power supply device in this embodiment of this application may replace a single-bus power supply device, that is, power may be supplied to a conventional communication device by using the direct current output bus A, and other direct current output buses supply power to other extended base station devices. Certainly, the single-bus power supply device may alternatively be reserved to supply power to the direct current output bus A. Based thereupon, a plurality of AC/DC units and bidirectional DC/DC units are added. For example, the second AC/DC unit, the third AC/DC unit, and the like are added to respectively output power to different direct current output buses and separately supply power to different loads. In addition, the power supply device in this embodiment of this application may alternatively be superposed on the single-bus power supply device. For example, the direct current output bus A may be used as an extended port, power superposition is implemented by superposing the power supply device in this embodiment of this application on the single-bus power supply device, and a battery backup unit is shared. The battery backup unit may be an original battery backup unit of the single-bus power supply device, to be specific, when the power supply device in this embodiment of this application is superposed on the single-bus power supply device to implement power superposition, no other battery backup unit is introduced. FIG. 6 is a schematic diagram showing that a power supply device is superposed on a single-bus power supply device according to an embodiment of this application. A direct current output bus A of the single-bus power supply device 600 is connected to a battery backup unit 690. The battery backup unit 690 may be an original battery backup unit 690 of the single-bus power supply device 600. Based thereupon, the direct current output bus A of the power supply device (namely, a multi-bus power supply device 700 and a multi-bus power supply device 800 in the figure) in the foregoing embodiment of this application is connected in parallel to the direct current output bus A of the single-bus power supply device 600. In other words, an input terminal of the single-bus power supply device 600 and input terminals of the multi-bus power supply device 700 and the multi-bus power supply device 800 in this embodiment of this application are connected to a same alternating current input bus 110. In this embodiment of this application, a direct current output bus A of the multi-bus power supply device 700, a direct current output bus A of the multi-bus power supply device 800, and the direct current output bus A of the single-bus power supply device 600 are used as one direct current output bus for output. In this way, quick superposition of power supply devices is implemented to obtain a direct current output bus A, a direct current output bus B1 to a direct current output bus BN, a direct current output bus C1 to a direct current output bus CL, and the like. Certainly, a plurality of power supply devices in the embodiments of this application can also be implemented in the foregoing manner.

According to the solution in this embodiment of this application, capacity expansion and quick superposition of a single-bus power supply device or a plurality of power supply devices in the embodiments of this application are supported, and central power backup and central management of all power supply devices are supported. The solution may be applied to a 5G new deployment or superposition scenario. A backup battery of the single-bus power supply device can be used to implement quick superposition and capacity expansion without direct current power distribution. The solution is applicable to a subsequent evolved capacity expansion 5G scenario or a 2G/3G/4G scenario. The solution in this embodiment of this application not only satisfies voltage regulation and energy saving required by 5G power supply, but also can reserve 2G/3G/4G power supply devices. Powers between systems may be mutually scheduled, central management and central power backup are implemented, and energy saving and consumption reduction and rapid and simple deployment are implemented.

If a power supply device includes a first AC/DC unit and a second AC/DC unit, a control method for the power supply device includes: determining that an AC/DC unit is faulty, isolating the faulty AC/DC unit, and enabling a bidirectional DC/DC unit, to supply, through a direct current output bus connected to an AC/DC unit that is not faulty, power to a direct current output bus connected to the faulty AC/DC unit.

If a power supply device includes a plurality of AC/DC units, a control method for the power supply device includes: determining that any AC/DC unit is faulty (if a plurality of AC/DC converters are connected in parallel in the AC/DC unit, all the AC/DC converters in the AC/DC unit are faulty), isolating the faulty AC/DC unit, and enabling a bidirectional DC/DC unit connected to the faulty AC/DC unit, so that another direct current output bus connected to the bidirectional DC/DC unit supplies, through the bidirectional DC/DC unit, power to a load on a direct current output bus corresponding to the faulty AC/DC unit.

Figure 7:
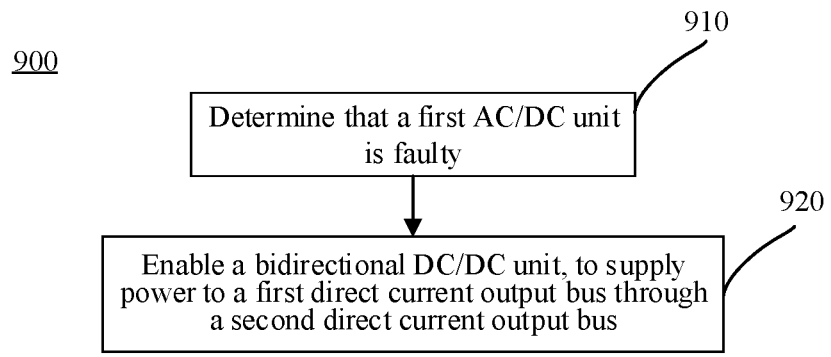
FIG. 7 is a schematic diagram of a control method according to an embodiment of this application.

FIG. 7 is a schematic diagram of a control method 900 for a power supply device according to an embodiment of this application. With reference to FIG. 4, an example in which the power supply device 400 includes the first AC/DC unit 310 and the second AC/DC unit 320 is used to describe the control method 900 for a power supply device. The control method 900 includes the following steps:

Step 910: Determining that the first AC/DC unit 310 is faulty, and isolate the first AC/DC unit 310.

Step 920: Enable the bidirectional DC/DC unit 470, to supply power to the first direct current output bus 340 through the second direct current output bus 350. It should be understood that the control method 900 may alternatively include the following step: Step 910: Determine that the second AC/DC unit 320 is faulty, and isolate the second AC/DC unit 320; and enable the bidirectional DC/DC unit 470, to supply power to the second direct current output bus 350 through the first direct current output bus 340.

Another example in which the power supply device 400 further includes a third AC/DC unit 330 is used for description. As shown in FIG. 4, it is determined that the third AC/DC unit 330 is faulty, and the third AC/DC unit 330 is isolated; and the bidirectional DC/DC unit 480 is enabled, to supply power to the third direct current output bus 360 through the first direct current output bus 330. For another example, it is determined that that the first AC/DC unit 310 is faulty, and the first AC/DC unit 310 is isolated; and the bidirectional DC/DC unit 470 or the bidirectional DC/DC unit 480 is enabled, to supply power to the first direct current output bus 330 through the second direct current output bus 350 or the third direct current output bus 360.

According to the solution provided in this embodiment of this application, power is output to a plurality of direct current output buses through a plurality of AC/DC units. The plurality of direct current output buses can output power independently, and respectively supply power to different types of loads. In such a multi-bus power supply solution, corresponding direct current output bus voltages can be configured for different types of loads.

In addition, for a long-distance load, boosting a voltage can reduce a line loss. Different loads have different voltage boost requirements. Such a multi-bus solution can satisfy voltage boost requirements of different loads, reduce a line loss, optimize terminal-to-terminal efficiency, and improve a remote capability.

In addition, fault compensation between the direct current output buses can be achieved by controlling the bidirectional DC/DC unit, thereby further ensuring stable power supply.

The control method 900 for a power supply device may further include: determining that a power supply capability of the first direct current output bus or the second direct current output bus is less than a load requirement; and enabling the bidirectional DC/DC unit, to control power compensation between the first direct current output bus and the second direct current output bus.

If a power supply device includes a plurality of AC/DC units, the control method 900 for a power supply device includes: determining that a power of any direct current output bus is insufficient, that is, a power supply capability of the direct current output bus is less than a load requirement, where in this case, a direct current voltage of the direct current output bus decreases; and enabling a bidirectional DC/DC unit connected to the direct current output bus, so that another direct current output bus connected to the enabled bidirectional DC/DC unit compensates a power for the direct current output bus with an insufficient power through the bidirectional DC/DC unit.

With reference to FIG. 4, an example in which the power supply device includes the first AC/DC unit 310 and the second AC/DC unit 320 is used for description. When it is determined that a power supply capability of a direct current output bus is less than a load requirement, the bidirectional DC/DC unit 470 is enabled, to control power compensation between the first direct current output bus 340 and the second direct current output bus 350. As an example rather than limitation, when it is determined that a power supply capability of the second direct current output bus 350 is less than a load requirement, for example, a decrease of an output voltage of the second AC/DC unit 320 is monitored, the bidirectional DC/DC unit 470 is enabled, to control the first direct current output bus 340 to transfer energy to the second direct current output bus 350 for power compensation.

Another example in which the power supply device 400 further includes a third AC/DC unit 330 is used for description. As shown in FIG. 4, when it is determined that a power supply capability of the first direct current output bus 340 is less than the load requirement, for example, a decrease of an output voltage of the first AC/DC unit 310 is monitored, the bidirectional DC/DC unit 470 or the bidirectional DC/DC unit 480 is enabled, to control the second direct current output bus 350 or the third direct current output bus 360 to transfer energy to the first direct current output bus 330 for power compensation.

According to the solution provided in this embodiment of this application, energy scheduling between the direct current output buses can be implemented by controlling the bidirectional DC/DC unit, a problem of insufficient power configuration utilization of a device at an existing site is resolved, power complementation in a scenario with a low probability peak is implemented, a low-power single-channel configuration is implemented, and design costs are reduced. In addition, the power scheduling can increase a single-point fault tolerance rate and improve the power supply reliability.

When the power supply device includes the first AC/DC unit and the second AC/DC unit and the battery backup unit is connected to the first direct current output bus, the control method 900 for a power supply device may further include: determining that the bidirectional DC/DC unit is faulty; by passing the faulty bidirectional DC/DC unit; and adjusting the second AC/DC unit, so that a direct current voltage of the second direct current output bus is the same as a direct current voltage of the first direct current output bus.

The control method 900 for a power supply device is described with reference to FIG. 4. That the bidirectional DC/DC unit 470 is faulty is determined, the bidirectional DC/DC unit 470 is bypassed, and the second AC/DC unit 320 is controlled, so that the direct current voltage of the second direct current output bus 350 is equal to the voltage of the first direct current output bus 340.

As an example rather than limitation, when the power supply device further includes another AC/DC unit and a plurality of bidirectional DC/DC units, the battery backup unit is connected to the first direct current output bus, and other direct current output buses may be separately connected to the first direct current output bus through the plurality of bidirectional DC/DC units. The control method 900 for a power supply device includes: determining that a bidirectional DC/DC unit is faulty, bypassing the bidirectional DC/DC unit, and adjusting the AC/DC unit, so that a voltage of a direct current output bus connected to the bidirectional DC/DC unit is the same as the voltage of the first direct current output bus and stays constant. In this way, the direct current output bus corresponding to the faulty bidirectional DC/DC unit can still share the battery backup unit, thereby improving power supply stability.

Another example in which the power supply device 400 further includes a third AC/DC unit 330 is used for description. As shown in FIG. 4, the battery backup unit 490 may be connected to the first direct current output bus 340. In this embodiment of this application, the control method 900 for a power supply device includes: determining that the bidirectional DC/DC unit 480 is faulty, bypassing the bidirectional DC/DC unit 480, and controlling the third AC/DC unit 330, so that a direct current voltage of the third direct current output bus 360 is equal to a voltage of the first direct current output bus 340.

The control method 900 for a power supply device may further include: determining that the alternating current input bus is faulty, and enabling the bidirectional DC/DC unit, so that the battery backup unit supplies power to each direct current output bus.

According to the solution in this embodiment of this application, the direct current output buses can share one battery backup unit, central power backup and central management can be implemented by controlling the bidirectional DC/DC unit, and an occupied area is reduced.

The power supply device provided in this embodiment of this application supports power supply to a 2G/3G/4G system and power supply to a new 5G system. In addition, a plurality of power supply buses in 5G can output power independently, are adjustable, and can be flexibly configured. In a 5G large power consumption scenario, a bus voltage can be adjusted. This effectively reduces a line loss, improves a remote capability, and optimizes terminal-to-terminal efficiency. Power scheduling between the direct current output buses can compensate for a power requirement of a single bus in a scenario with a low probability peak power, to reduce a need for a single power configuration and reduce design costs. Central power backup and central network management reduce system components and an occupied area when sites are superposed or a new site is built. Supporting of quick superposition and capacity expansion and a direct current interface change-free superposing scenario can implement quick deployment of a 5G site power source.

All or some of the foregoing embodiments may be implemented by software, hardware, firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, "at least one of . . . ", "at least one of . . . ", or a similar expression herein denotes any combination of listed items. For example, at least one of A, B, and C (or at least one of A, B, or C) may represent seven cases: Only A exists, only B exists, only C exists, A and B exist, A and C exist, B and C exist, and A, B, and C exist. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination of the examples described in the embodiments disclosed in this specification, units and algorithm steps can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions in the embodiments. In addition, function units in the embodiments of this application may be integrated into one processing unit, or each of the units may exist alone physically, or two or more units may be integrated into one unit. When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power supply device, comprising:
   a first alternating current/direct current (AC/DC) unit, wherein an input terminal of the first AC/DC unit is connected to an alternating current input bus, and an output terminal of the first AC/DC unit is connected to a first direct current output bus;
   a second AC/DC unit, wherein an input terminal of the second AC/DC unit is connected to the alternating current input bus, and an output terminal of the second AC/DC unit is connected to a second direct current output bus; and
   a bidirectional direct current/direct current (DC/DC) unit, wherein the bidirectional DC/DC unit is connected between the first direct current output bus and the second direct current output bus.

2. The power supply device according to claim 1, wherein a voltage of the first direct current output bus is different from a voltage of the second direct current output bus.

3. The power supply device according to claim 1, wherein the second AC/DC unit is output adjustable; and
   the power supply device further comprises a first controller, wherein the first controller is configured to: determine a direct current voltage of the second direct current output bus, and adjust the second AC/DC unit based on the direct current voltage.

4. The power supply device according to claim 1, further comprising:
   a second controller, wherein the second controller is configured to: when determining that the first AC/DC unit is faulty, enable the bidirectional DC/DC unit, to supply power to the first direct current output bus through the second direct current output bus.

5. The power supply device according to claim 1, further comprising:
   a third controller, wherein the third controller is configured to: when determining that a power supply capability of the first direct current output bus is less than a load requirement, enable the bidirectional DC/DC unit, to control power compensation between the first direct current output bus and the second direct current output bus.

6. The power supply device according to claim 1, wherein the first AC/DC unit is an output stable AC/DC unit; and the power supply device further comprises a battery backup unit, wherein a direct current output terminal of the battery backup unit is connected to the first direct current output bus.

7. The power supply device according to claim 6, further comprising:
   a fourth controller, wherein the fourth controller is configured to: when determining that the bidirectional DC/DC unit is faulty, bypass the bidirectional DC/DC unit, and adjust the second AC/DC unit to make a direct current voltage of the second direct current output bus be the same as a direct current voltage of the first direct current output bus.

8. The power supply device according to claim 6, further comprising:
   a fifth controller, wherein the fifth controller is configured to: when determining that the alternating current input bus is faulty, enable the bidirectional DC/DC unit to make the battery backup unit supply power to the second direct current output bus.

9. A control method for a power supply device, wherein the power supply device comprises a first alternating current/direct current (AC/DC) unit, a second AC/DC unit, a bidirectional direct current/direct current (DC/DC) unit, and a battery backup unit; and wherein an input terminal of the first AC/DC unit is connected to an alternating current input bus, an output terminal of the first AC/DC unit is connected to a first direct current output bus, the first AC/DC unit is an output stable AC/DC unit, an input terminal of the second AC/DC unit is connected to the alternating current input bus, an output terminal of the second AC/DC unit is connected to a second direct current output bus, the second AC/DC unit is output adjustable, the bidirectional DC/DC unit is connected between the first direct current output bus and the second direct current output bus, and a direct current output terminal of the battery backup unit is connected to the first direct current output bus; and
   the method comprises:
   determining that the first AC/DC unit is faulty; and
   enabling the bidirectional DC/DC unit, to supply power to the first direct current output bus through the second direct current output bus.

10. The control method according to claim 9, further comprising:
    determining that a power supply capability of the first direct current output bus is less than a load requirement; and
    enabling the bidirectional DC/DC unit, to control power compensation between the first direct current output bus and the second direct current output bus.

11. The control method according to claim 9, further comprising:
    determining that the bidirectional DC/DC unit is faulty; and
    bypassing the bidirectional DC/DC unit, and adjusting the second AC/DC unit to make a direct current voltage of the second direct current output bus be the same as a direct current voltage of the first direct current output bus.

12. The control method according to claim 9, further comprising:
    determining that the alternating current input bus is faulty; and
    enabling the bidirectional DC/DC unit to make the battery backup unit supply power to the second direct current output bus.

13. A base station, comprising:
a power supply device configured to supply power to the base station, wherein the power supply device comprises:
- a first alternating current/direct current (AC/DC) unit, wherein an input terminal of the first AC/DC unit is connected to an alternating current input bus, and an output terminal of the first AC/DC unit is connected to a first direct current output bus;
- a second AC/DC unit, wherein an input terminal of the second AC/DC unit is connected to the alternating current input bus, and an output terminal of the second AC/DC unit is connected to a second direct current output bus; and
- a bidirectional direct current/direct current (DC/DC) unit, wherein the bidirectional DC/DC unit is connected between the first direct current output bus and the second direct current output bus.

14. The base station according to claim 13, wherein a voltage of the first direct current output bus is different from a voltage of the second direct current output bus.

15. The base station according to claim 13, wherein the second AC/DC unit is output adjustable; and
the power supply device further comprises a first controller, wherein the first controller is configured to: determine a direct current voltage of the second direct current output bus, and adjust the second AC/DC unit based on the direct current voltage.

16. The base station according to claim 13, wherein the power supply device further comprises:
a second controller, wherein the second controller is configured to: when determining that the first AC/DC unit is faulty, enable the bidirectional DC/DC unit, to supply power to the first direct current output bus through the second direct current output bus.

17. The base station according to claim 13, wherein the power supply device further comprises:
a third controller, wherein the third controller is configured to: when determining that a power supply capability of the first direct current output bus is less than a load requirement, enable the bidirectional DC/DC unit, to control power compensation between the first direct current output bus and the second direct current output bus.

18. The base station according to claim 13, wherein the first AC/DC unit is an output stable AC/DC unit; and
the power supply device further comprises a battery backup unit, wherein a direct current output terminal of the battery backup unit is connected to the first direct current output bus.

19. The base station according to claim 18, wherein the power supply device further comprises:
a fourth controller, wherein the fourth controller is configured to: when determining that the bidirectional DC/DC unit is faulty, bypass the bidirectional DC/DC unit, and adjust the second AC/DC unit to make a direct current voltage of the second direct current output bus be the same as a direct current voltage of the first direct current output bus.

20. The base station according to claim 18, wherein the power supply device further comprises:
a fifth controller, wherein the fifth controller is configured to: when determining that the alternating current input bus is faulty, enable the bidirectional DC/DC unit to make the battery backup unit supply power to the second direct current output bus.

* * * * *